United States Defensive Publication [19] (H) [11] T973,012

Hyche et al. [43] Aug. 1, 1978

[54] COMPOSITIONS SUITABLE FOR MAKING FLOOR TILE

[76] Inventors: Kenneth W. Hyche, Rte. 3, Cooks Valley Rd.; Martin F. Schick, 1360 Holyoke St., Apt. 28, both of Kingsport, Tenn. 37664

[21] Appl. No.: 860,499

[22] Filed: Dec. 14, 1977

Related U.S. Application Data

[63] Continuation of Ser. No. 657,348, Feb. 11, 1976.

[51] Int. Cl.[2] ..... C08L 91/00

[52] U.S. Cl. ..... 260/23 H; 260/23.7 R; 260/23.7 C; 260/23.7 M; 260/28.5 A; 260/28.5 B; 260/42.37; 260/42.46; 260/42.47; 260/45.85 B; 260/45.95 R; 260/897 A

[57] ABSTRACT

A molding composition capable of forming floor tile comprising (1) about 100 parts of an ethylene containing thermoplastic rubber, (2) about 50 to 200 parts of polyolefin and (3) about 100 to 700 parts filler.

14 Claims, No Sheets Drawing,

13 Pages Specification

The file of this unexamined application may be inspected and copies thereof may be purchased (849 O.G. 1221, Apr. 9, 1968).